United States Patent Office 3,806,329
Patented Apr. 23, 1974

3,806,329
GLASS DRAWING METHOD AND APPARATUS
Claude Brichard, Moustier-sur-Sambre, Belgium, assignor to Glaverbel S.A., Watermael-Boitsfort, Belgium
Filed July 14, 1972, Ser. No. 271,757
Claims priority, application Luxembourg, July 14, 1971, 63,535
Int. Cl. C03b 15/12
U.S. Cl. 65—95
49 Claims

ABSTRACT OF THE DISCLOSURE

Method and apparatus for improving the quality of a drawn, flat glass ribbon by providing a periodic gas displacing force such as a gas blower to the atmosphere of a drawing chamber and/or an annealing shaft at a place where the glass ribbon has a viscosity from $10^{7.6}$ poises to $10^{13}$ poises.

BACKGROUND OF THE INVENTION

The present invention relates to a process of manufacturing sheet glass by supplying molten glass to a drawing zone and drawing glass from that zone as a continuous ribbon which is guided through zones in which the glass sets and cools. The invention also relates to apparatus for use in manufacturing sheet glass by this process.

There are various known processes for manufacturing sheet glass by drawing a ribbon of molten glass from a drawing zone to which molten glass is supplied. In some of these processes the ribbon is drawn from the surface of a quantity of molten glass flowing to the drawing zone. An example of such a process is the classical Pittsburgh process in which the molten glass which flows into the ribbon is derived from the upper levels of a bath of molten glass. Another example of such a process is the classical Libbey-Owens or Colburn process in which molten glass flows into the ribbon from the full depth of a relatively shallow bath.

Surface-drawing processes are not confined to the classical ones which have been specifically mentioned. For example, it is known to draw the ribbon from a supply of molten glass which is fed to the drawing zone while floating on a bath or layer of molten material, e.g., a molten metal, of hgher specific gravity acting as a lubricant between the molten glass and the sole of a refractory kiln in which the molten materials are held. As another example of a special type of surface-drawing process, the ribbon of glass, instead of being drawn via a meniscus formed at a free fluid surface of the supply of molten glass, may be drawn from a menicus which is cooled to prevent flow of molten glass beyond the location of the meniscus as e.g., is described in United Kingdom Pat. No. 988,128.

Although they are not as important for the purpose of introducing the present invention, mention is also made of processes in which the ribbon of molten glass is extruded from beneath the surface of the supply of molten glass. The most notable process of this kind is the classical Fourcault process in which the molten glass is extruded upwardly through a slot in a so-called debiteuse which is partly immersed in the quantity of molten glass which flows to the drawing zone. Such extrusion processes are in many ways radically different from the surface-drawing processes and require for their satisfactory performance a body of practical knowledge which cannot be gained from experience with surface-drawing processes. Although the present invention, which will be hereinafter defined, can be applied with advantage in extrusion-type processes, it is emphasized that the invention is of appreciably greater advantage in surface-drawing processes due to the different thermal and rheological conditions which prevail in such processes.

In all of the known processes of drawing sheet glass the ribbon of molten glass is drawn from the drawing zone through a drawing chamber in which the ribbon becomes dimensionally set and the ribbon is led on through a shaft in which the ribbon progressively cools preparatory to being cut into sections. The shaft, which is known as an annealing shaft, can be a vertical shaft surmounting the drawing chamber, as for example in the classical Pittsburgh process. Alternatively the shaft can be a horizontal shaft into which the ribbon passes after being bent about a bending roll. A horizontal shaft is used in the classical Libbey-Owens process. Of course the classical processes are subject to many variations and a given process can embody features derived from classical processes of different types. To take one example, a horizontal shaft is used in certain processes in which the ribbon is drawn from a bath of molten glass of appreciable depth as in the classical Pittsburgh process but is bent about a bending roll as in a classical Libbey-Owens process.

In all the known glass drawing processes the glass ribbon is exposed to the influence of environmental gas currents which exert on the ribbon a cooling action which is irregular in both time and space. These currents are due to various causes. Due to the interconnection of the drawing chamber and the annealing shaft, the shaft has a chimney effect, causing a system of natural draft currents to propagate through the drawing chamber and the annealing shaft. Hot gas currents flow upwardly along the central region of the ribbon from the intensely hot drawing zone, through the drawing chamber and into the annealing shaft and cooler currents of glases flow back into the drawing chamber from the annealing shaft along the walls of the apparatus. The chimney effect is very marked when the annealing shaft is vertical. The chimney effect is however, also a very important factor in the classical Libbey-Owens or Colburn process and in other processes using a horizontal annealing shaft.

The rising currents of hot gas caused by the aforesaid chimney effect increase in temperature and velocity during their movement through the drawing chamber and give rise to turbulence in the upper part of the chamber. There is an interaction between these turbulent currents and the natural draft currents which flow from the drawing chamber into the annealing shaft and vice versa. This interaction gives rise to a complex system of currents which also plays a part in creating adverse heat distribution across the ribbon.

Some of the cooler gas flowing back into the drawing chamber from the annealing shaft tends to flow down within the drawing chamber along the walls thereof and then, as it becomes heated, to flow inwardly along generally upwardly inclined paths to join the main upward convection current of gas along the central longitudinal portion of the ribbon path. In the course of such flow some of this cooler gas sweeps across the marginal zones of the ribbon path and this also gives rise to adverse conditions.

Another cause of thermal heterogeneities in the environmental conditions is the leakage of currents of ambient air into the drawing chamber through cracks in the refractory walls or via imperfectly sealed joints between such walls and components which extend through such walls into the drawing chamber.

Yet another cause of problematical environmental gas currents is the cooler or coolers (when present) provided in the drawing chamber. It is usual for a cooler to be located on one or each side of the glass ribbon, at a level quite close to its source, in order to accelerate the cooling of the ribbon as it is drawn from the supply of molten glass. The gases cooled by such coolers tend to fall down onto the molten glass at the drawing zone and to influence the distribution of heat in the main upward currents caused by the aforesaid chimney effect. It is difficult to eliminate temperature differences in such descending cooled gases as between one region and another across the ribbon width. Any irregularities in the cooling action of these gases are of course liable to have seriously adverse effects on the drawn glass ribbon because they play upon its surface where the glass is at very low viscosity.

In some processes one or more additional coolers is or are provided at a higher level in the drawing chamber. Any such additional higher level cooler further increases the rate of cooling of the glass ribbon but the influence of such a cooler on the pattern of convection currents set up in the drawing chamber is quite different from that of a cooler located near the ribbon source. Thermally heterogeneous gas currents at such higher level have their own peculiar effect on the ribbon due to the characteristic flow pattern and velocities of such currents and on the condition of the ribbon surfaces at that higher region of the drawing chamber.

It is well known that the irregular cooling action of enviromental gas currents is the cause of defects in the geometry of the drawn sheet glass. More particularly, the irregular cooling action prevents the drawing of sheet glass with faces which are truly flat and parallel at all positions. Due to the lack of true flatness and parallelism of the sheet faces, the sheet glass causes angular deflections of light waves travelling through the glass so that objects viewed through the glass under certain conditions appear distorted.

These defects in the drawn sheet glass are of various kinds. Some defects are in the form of waves running more or less parallel to the line of draw of the glass. These defects are mainly caused by the effect of the cool air falling from the cooler or coolers located near the source of the ribbon as hereinbefore referred to. The wave defects are quite apparent when viewing objects at a shallow angle through the sheet glass in a plane normal to the line of draw, particularly during change in the viewing angle.

Another kind of defect is known as "martelage" or "hammering." This kind of defect takes the form of an haphazard distribution of shallow surface depressions usually measuring from 1 to 4 cm. across. These defects which are mainly caused by the effect of the additional cooler or coolers located at a higher level in the drawing chamber as hereinbefore referred to, although they are normally less apparent than waves, are nevertheless also apparent to ordinary observation due to their distorting effect on objects viewed through the glass at shallow angles to the sheet.

Yet another kind of defect appears as intersecting series of diagonal and vertical lines, predominantly in outer portions of the ribbon width, with the diagonal lines running upwardly away from the side margins towards the central region of the ribbon. This kind of defect is attributable, inter alia, to the movement along upwardly inclined paths within the drawing chamber, across the marginal portions of the ribbon, of some of the gases which flow back along the walls of such chamber from the annealing shaft as hereinbefore referred to, and to the aforementioned leakage currents of cooler air into the drawing chamber through its walls.

In many cases, drawn sheet glass exhibits defects which in a shadowgraph appear as dark stripes of limited length. These defects (hereinafter called "dark stripes") are elongated shallow surface depressions. Unlike waves, these defects are not continuous along the length of the ribbon but they are much larger in extent than hammering marks and sometimes have a length up to 50 cm. or more. These dark stripes are not normally apparent to ordinary observation but unless they are masked by more serious defects, they are apparent when light rays are projected through the sheet glass at shallow angles (less than 15°) to the sheet, onto a light-diffusing screen.

The presence of surface defects in the form of waves necessarily involves minute local variations in the thickness of the sheet glass from one place to another but sheet glass also exhibits general and larger variations in thickness. These general variations are not attributable to surface defects but to differences between the quantities of molten glass drawn from the supply of molten glass into different parts of the ribbon width due to viscosity variations. In the case that the ribbon surfaces are marred by waves, the general thickness variations involve differences in the mean thickness of the sheet measured at different regions across the sheet.

The desire to approach further toward the ideal of producing drawn sheet glass which is quite free from optical defects has stimulated much research in the sheet glass manufacturing industry into ways of creating a more favorable heat distribution in the environment through which the ribbon is drawn and cooled. As a result, many proposals have ben made with a view to establishing a predictable and more favorable tempearture profile across the glass ribbon path at a region where the glass composing the ribbon has a very low viscosity and is most susceptible to deformation under the influence of local temperature variations. These proposals have ben in effect to create gaseous currents of predetermined temperature and velocity characteristics in the lower portion of the drawing chamber to replace the randomly distributed cooling action of the various convection currents, or alternatively to act on such convection currents in the lower portion of the drawing chamber to modify their distribution across the ribbon path.

In practice some of these hitherto proposed measures have been found to be capable of improving the optical qualities of the sheet glass, notably by avoiding or reducing the occurrence of waves. However, notwithstanding attempts to develop and refine these corrective measures the sheet glass is still marred by certain finer surface defects which although they do not impair the optical quality of the sheet glass to the same extent as waves nevertheless do give rise to optical distortion and make the sheet glass unsuitable for use in situations which call for sheet glass of very high optical qualities. The finer defects here referred to are the "dark stripes" hereinbefore referred to. These defects have been found to persist even though the known corrective measures for avoiding cooling irregularities are taken. Thus it is that in the present state of the art, a process has yet to be found by which sheet glass which has flat surfaces and is of uniform thickness and which is otherwise of optimum optical quality can be drawn with consistent reliability.

SUMMARY OF THE INVENTION

The main object of the present invention is to provide another form of corrective measure which influences the conditions to which the surfaces of the drawn glass ribbon are exposed so as to make possible a further improvement in the realizable quality of sheet glass. In particular, the invention aims to provide a corrective measure to avoid or reduce the incidence of dark stripes.

According to the present invention, a process of manufacturing sheet glass by supplying molten glass to a drawing zone and drawing glass from that zone as a continuous ribbon which is guided through zones in which the glass sets and cools, is improved in that in at least one zone along the ribbon path where the viscosity of the glass is not less than $10^{7.6}$ poises and not more than $10^{13}$ poises, and in at least one direction across the ribbon path, a gas displacing force is exerted periodically thereby to cause a fluctuating displacement of gases across the ribbon.

It has been found that when a displacement of gases is brought about in a region where the glass is within the specified viscosity range, such displacement has a considerable beneficial effect on the surface quality of the sheet glass. In effect, such displacement has been found to avoid or reduce the occurrence of dark stripes, which have persisted despite the employment of the previously known corrective measures. This result, attainable by the invention, is surprising. It is understandable that hitherto, when attempting to improve the gaseous environment through which the glass is drawn, attention should have been confined to those regions of the ribbon path where the viscosity of the glass is very low. In most glass drawing processes, the viscosity of the glass in the region of critical formation of the ribbon in the lower part of the drawing chamber is very substantially lower than $10^{7.6}$ poises. As distinct from the previously proposed corrective measures as hereinbefore referred to, which are concerned with phenomena occurring in the regions where the ribbon glass is hottest, the process according to the present invention requires action to be taken on the environment of the ribbon at a different stage of its progress. In many embodiments of the invention this action is taken, as will hereafter be exemplified, actually within the annealing shaft.

The results achieved by the present invention give rise to the supposition that the troublesome dark stripes which have hitherto proved impossible to avoid may be due partly or even mainly to an effect of the complex system of gas currents which is set up in the upper part of the drawing chamber due to the interaction of turbulent and natural draft currents as hereinbefore described. However, the precise reasons for the successful results are not known with any certainty.

A further advantage of the invention is that as the occurrence of the aforesaid dark stripes is generally more in evidence according as the drawing speed is higher, the employment of a process according to the invention in a given drawing machine affords the advantage, other conditions being equal, that sheet glass of a given quality can be produced at a faster rate.

The exertion of gas displacement forces as required by the invention contributes to eliminate abrupt temperature changes across the ribbon path or across that portion thereof where the specified displacement of gas is brought about. It is essential that within the part of the ribbon path extending between the viscosity limits of $10^{7.6}$ and $10^{13}$ poises there is at least one direction across the ribbon in which a gas displacing force is exerted periodically. In other words there is a gas displacing force which is exerted and at least partly relaxed, and then again exerted and at least partly relaxed, and so on repetitively. By virtue of the periodic exertion of such gas displacing force there is a displacement of gases across the ribbon and the displacement fluctuates. In other words the volume rate of displacement of gases caused by such force is not uniform but increases and decreases alternately. The important factor is that there is a gas displacement force which is repetitively exerted and then at least partly relaxed. The importance of this repetitive exertion of force is that it involves a periodic disturbance of conditions in the environment of the ribbon at the place where such force is exerted. In consequence, a steady-state condition involving persistence of a temperature maximum or temperature maxima at a fixed marginal position or positions across the ribbon path cannot become established as it might be, for example, if a constant and continuous gas displacing force were to be exerted in one direction.

Preferably a gas displacing force is periodically exerted in at least one zone along the ribbon path where the viscosity of the glass is not less than $10^{10}$ poises.

The invention is particularly effective in preventing the occurrence of dark stripes when gas displacing forces are exerted in at least one zone where the viscosity of the glass is $10^{10}$ poises or more.

In certain embodiments of the invention, the ribbon of glass is cooled while passing upwardly through a vertical annealing shaft, the cross section of which is locally reduced at the bottom to define an entry slot for the ribbon and a gas displacing force is periodically exerted in the entry slot. It has been found that the occurrence of dark stripes can most readily be avoided by exerting a gas displacing force at such position. This is probably due to the fact that the natural draft currents which play a part in creating the complex system of gas currents in the immediately adjacent part of the drawing chamber by interacting with the turbulent currents therein, have a high velocity in the entry slot, due to the restricted cross-sectional dimensions of the gas flow paths at that position.

The invention also includes processes in which the ribbon of glass is cooled while passing upwardly through a vertical annealing shaft, the cross section of which is locally reduced at the bottom to define an entry slot for the ribbon as aforesaid, in which slot a gas displacing force is periodically exerted in at least one zone in the vertical shaft. The exertion of the force at such a zone or zones is also very effective for countering the formation of dark stripes. This is probably due to the fact that the velocities of the natural draft currents in contact with the glass, although not so great as in the entry slot, are also appreciable, and certainly greater than in the drawing chamber. In the case that the gas displacing force or forces is or are exerted in a zone or zones within the annealing shaft, it is of course essential for such zone or at least one of such zones to be a zone where the glass is in the aforementioned viscosity range of $10^{7.6}$ to $10^{13}$ poises. It is of course permissible and advantageous to exert the gas displacing force both in the aforesaid entry slot and at one or more zones within the annealing shaft.

In the case that the invention is performed in a process wherein the ribbon of glass is bent over a bending roller preparatory to being advanced through a horizontal annealing shaft, it is preferable for a gas displacing force to be periodically exerted in at least one zone which is downstream of the bending roller along the ribbon path. The best results in terms of the absence of dark stripes in the drawn sheet glass are achieved when exerting the gas displacing forces in such a zone or zones, i.e., within the annealing shaft or, if space permits, between the bending roller and the entrance to such shaft. This may well be due to the facts that the region immediately in front of the entrance to the annealing shaft is the region of formation of the complex system of gas currents resulting from the interaction of natural draft and turbulent currents, and the natural draft currents which help to create that complex system have quite a high velocity in the shaft.

The fluctuating gas displacements required by the invention must be brought about without introducing a fresh cause of an adverse heat distribution such as would offset the advantages of producing the gas displacements. It is permissible for the gas displacements to be brought about in a way which involves the supply of heat or cold to the environment of the ribbon provided that such an adverse heat distribution is avoided. Nevertheless, in preferred embodiments of the invention the fluctuating displacement of gases is brought about substantially without increasing the rate of cooling of the glass ribbon. It is a very important advantage that the invention enables an improvement in the surface quality of the sheet glass to be achieved in a given process and a given plant without any modification of the cooling rate of the glass ribbon. This cooling rate can accordingly be determined entirely by other factors as in normal practice.

A periodically exerted gas displacing force as required by the invention may be superimposed on a permanently applied force which causes gas displacement in the direction of such periodically exerted force permanently prevents a normal pattern of natural draft currents from becoming established. However, in preferred embodiments of the invention there is at least one zone along the ribbon path where displacement of gases across the ribbon path occurs and where such displacement is exclusively caused by the periodic exertion of gas displacing force in at least one direction. If only periodically exerted forces are responsible for effecting displacements of gases across the ribbon path it is possible to confine the influence of such displacements substantially entirely to one side of the ribbon. This is in some processes of importance due to the difference between the natural environmental conditions on the opposite sides of the ribbon. Such a difference is often particularly in evidence in processes in which the ribbon is bent about a bending roller preparatory to entering a horizontal annealing shaft.

A periodically exerted gas displacing force as required by the invention may be exerted in one direction only, in at least one zone along the ribbon path. The required gas displacements can then be provided for in a very simple way because it is then only necessary for the component or components of hardware for enabling such force to be exerted to have access through the peripheral wall of the drawing machine at one region around the ribbon path.

In the most preferred embodiments of the invention, gas displacing force is periodically exerted in one direction and in a reverse direction across the ribbon path, in at least one zone therealong, the forces acting in the different directions across the ribbon path being exerted and relaxed out-of-phase, thereby to cause displacement of gases on one or each side of the ribbon first in one direction across the ribbon and then in a reverse direction across the ribbon. It has been empirically established that the production in that way of a to-and-fro movement of gases across the ribbon is conducive to the drawing of glass of the highest quality. By producing such a to-and-fro movement it is easy completely to prevent the establishment of any steady state in the environmental gas flow pattern in any given zone along the ribbon path. Moreover the magnitude of the gas displacing forces necessary for ensuring that a given width of ribbon path is influenced by the gas displacements is less when such forces act in different directions across such path than when reliance is placed on forces acting in one direction only. If gas displacing forces above a certain magnitude are exerted there is a tendency for adverse turbulent conditions to arise in one or more local regions across the ribbon path. Therefore the out-of-phase exertion of forces in different directions as aforesaid is also of advantage for avoiding this problem.

When a gas displacing force is periodically exerted in one direction and in a reverse direction across the ribbon path as aforesaid, the forces acting in the different directions are advantageously exerted at positions which are substantially directly opposed across such path. The exertion of the forces at such directly opposed positions is recommended in order that there shall be coincidence or a high degree of overlap between the regions of the effective gas displacements caused by the out-of-phase forces.

In stating that forces are exerted in one direction and in a reverse direction across the ribbon path this does not mean that the lines of action of the oppositely directed forces are necessarily parallel. What is meant is that in one part of a cycle a force is exerted in a direction away from one margin and towards the opposite margin of the ribbon path and that in the following part of the cycle a force is exerted in a direction away from such opposite margin and towards the one margin of the ribbon path. The lines of action of the forces which act across the ribbon path in opposite directions may for example converge from opposed margins of the ribbon path towards a central longitudinal zone of such path. It is, however, preferable for the out-of-phase forces to act in directly opposite directions because in that case the correspondence between the regions influenced by the successive gas displacements is greatest.

According to another preferred feature which is applicable in the case that out-of-phase gas displacing forces are exerted in opposite directions across the ribbon path, each exertion of force in one direction immediately follows or coincides with the relaxation of force exerted in the reverse direction. The advantage of this feature is that a continuous to-and-fro motion of the gases is produced.

In important embodiments of the invention there is at least one zone along the ribbon path where displacement of gases across such path occurs due to successive exertions of force in that zone at a frequency such that a steady state of the gas currents along the ribbon path does not become established or does not become established for sufficiently long a period for the glass to be adversely affected thereby.

The existence of such a steady state implies the existence or risk of an adverse disparity in temperature between different regions across the ribbon, for reasons which have already been described. If any given zone along the glass ribbon is exposed to such conditions for longer than a certain period of time, which depends on the viscosity of the glass in that zone, the surface of the glass is liable to be adversely affected. A steady state of the natural draft gas currents can be tolerated for a greater length of time in zones along the ribbon path where the glass ribbon has a relatively high viscosity, e.g., a viscosity of the order of $10^{13}$ poises, than in zones where the glass viscosity is much lower.

In certain embodiments of the present invention, there is at least one zone along the ribbon path where an out-of-phase exertion and relaxation of gas displacing forces occurs and where the frequency of exertion of force in each direction is such that the period of each cycle from the commencement of one exertion to the commencement of the next exertion of force in that direction is not more than 10 minutes. Empirical data show that by operating at frequencies within this range the environmental conditions can be disturbed sufficiently to prevent a normal pattern of natural draft currents from becoming established and it is not necessary to exert forces of very high magnitude. Advantageously, the force exertion period and the relaxation period constituting each cycle are in a ratio of from 1:2 to 2:1. This range represents a very satisfactory energy distribution in course of time.

In optimum processes wherein to-and-fro gas displacements are produced, each force exertion period of each cycle is from 1 to 10 seconds. It has been established that by observing this condition the environmental conditions can be adequately periodically disturbed without any risk of the occurrence of new adverse steady-state conditions such as might be produced if a given force exertion were to persist for a prolonged period of time. In certain processes, an optimum energy distribution in course of time is realized by operating according to a cycle in which the force exertion period and the relaxation period of each cycle are of substantially equal duration.

It is not essential for gas displacing force to be exerted which causes displacement of gases over the full width of the ribbon because if the gas displacement is confined to only a part of the ribbon width there will be an improvement in the quality of the glass over that part and that in itself is of real value, particularly bearing in mind that usually the ribbon has eventually to be cut into pieces and that some of these will derive from the higher quality regions of the ribbon. However, it is preferable for a gas displacement to be brought about substantially over the full width of the ribbon so that the improvement in quality is achieved for substantially the entire amount of drawn sheet glass.

For achieving the best gas flow conditions across the ribbon, it is recommended that a gas displacing force be periodically exerted substantially parallel with the faces of the ribbon.

It has also been found to be an advantage for a gas displacing force to be periodically exerted in at least one direction which is substantially normal to the direction of movement of the ribbon.

In certain embodiments, there is at least one zone along the ribbon path where a gas displacing force is periodically exerted at only one side of the ribbon.

The main advantage of exerting the forces at one side only of the ribbon is that the forces can be made to influence environmental conditions only or primarily on one side of the ribbon. This is sometimes of importance, for example, in processes in which one face of the ribbon is in the normal way more prone to be spoiled by dark stripes than the other. When applying the invention in a classical Pittsburgh type drawing process it will often be found more beneficial to exert the gas displacing forces at the rear side of the ribbon, i.e. the side facing towards the cul-de-sac, whereas in a classical Libbey-Owens type process the front side of the ribbon, i.e., the side which contacts the bending roller, is the one which is usually of lower quality and which most stands to benefit from the displacements of gas across the ribbon path. In addition, there is the advantage, in the construction of the plant, that it is easier to provide for the exertion of forces at one side of the ribbon than at both sides.

The advantage from the point of view of plant construction of providing for the exertion of force at only one side of the ribbon can be realized even if it is required to bring about displacements of gases across both sides of the ribbon. Thus, there may be at least one zone along the ribbon path where a gas displacing force is periodically exerted at only one side of the ribbon but so as to cause displacements of gases across the ribbon on both sides thereof.

However, in certain embodiments of the invention in which there is at least one zone in which the environmental conditions on both sides of the ribbon are influenced by gas displacements across the ribbon, gas displacing force is periodically exerted on each side of the ribbon. In that way it is easier to achieve a predetermined displacement of gases on both sides of the ribbon.

Particular importance is attached to processes according to the invention wherein a gas displacing force is periodically exerted, in at least one zone along the ribbon path, by blowing gas into the environment of the ribbon. It is an important advantage of this mode of operation that the requisite forces can be exerted without the need to provide moving parts in the vicinity of the ribbon where they would be exposed to the high temperature conditions there prevailing. Another important advantage is the fact that by blowing gas into the environment of the ribbon the gas displacing forces can be exerted in a well defined direction.

Preferably, a gas displacing force is periodically exerted in at least one zone by blowing gas into thee environment of the ribbon at a speed of from 1 to 50 m./sec.

It has been found that the most marked improvements in the quality of the drawn sheet glass are usually obtained when working within this range.

It is advantageous for a periodically exerted gas displacing force to be exerted by blowing gas into the environment of the ribbon, under a pressure in the range 100 g.– 1000 g./cm.$^2$. Under such pressures, the displaced gases can be given a velocity and kinetic energy such that the displacement has a very beneficial effect on the environmental conditions for achieving the required improvement in the quality of the glass.

The invention includes processes in which a gas displacing force is periodically exerted, in at least one zone along the ribbon path, by the action of mechanical means in the environment of the ribbon. Although in this mode of working it is necessary to install a moving part or parts in the vicinity of the ribbon there is the advantage that the gas displacing forces are exerted without altering the composition of the environment by introducing further quantities of gas. Consequently, there is no significant alteration of the ribbon cooling schedule and there is no risk of introducing undesirable substances into the atmosphere in contact with the ribbon.

When carrying out the invention additional measures can be taken for avoiding or reducing the occurrence of waves in the surface of the glass ribbon. Various corrective measures for this purpose are known per se and have already been referred to. However a particularly effective method of countering wave formation comprises the displacement of gases across the ribbon path at a zone or zones where the ribbon has a very low viscosity. In certain processes according to the invention, in addition to the exertion of gas displacing forces in at least one zone along the ribbon path where the viscosity of the glass is not less than $10^{7.6}$ poises and not more than $10^{13}$ poises, gas displacing forces causing displacements of gases in at least one direction across the ribbon on one or each side thereof are also exerted in at least one zone along the ribbon path where the viscosity of the glass is less than $10^{7.6}$ poises. In the event that such action is taken, its effect in countering wave formation appears to be enhanced by the exertion of gas displacing forces at a higher viscosity zone or zones in accordance with the invention. In other words there is in that respect an interaction between the effects resulting from the two measures. In most cases it is suitable and recommendable, for countering wave formation, to exert such additional gas displacing forces in a lower portion of the zone through which the glass ribbon is drawn and in which it becomes dimensionally set.

The invention can be applied successfully in a wide variety of gas drawing processes, for example, in a process in which molten glass flows into the ribbon from the full depth of a quantity of molten glass in a channel into which molten glass is continuously fed, in a process in which molten glass flows into the ribbon from the upper levels of a mass of molten glass in a channel into which molten glass is continuously fed, and in a process in which the ribbon is drawn from molten glass floating on a mass of material of higher specific gravity.

The invention includes apparatus for use in manufacturing sheet glass, having a drawing chamber and a contiguous annealing shaft, and means for drawing a continuous ribbon of glass into such drawing chamber from a drawing zone fed with molten glass and conducting the ribbon along a path extending through such drawing chamber and annealing shaft. The apparatus includes means for periodically exerting a gas displacing force in at least one zone along the ribbon path where the viscosity of the glass, when the apparatus is in use, is not less than $10^{7.6}$ poises and not more than $10^{13}$ poises, and in at least one direction across the ribbon path, thereby to cause a fluctuating displacement of gases across the ribbon.

Such apparatus has the notable advantage that it enables sheet glass to be drawn which is substantially or completely free of dark stripes. Various advantageous apparatus features which can be incorporated in apparatus according to the invention will now be referred to. Many of these further features are for the purpose of adopting process features which have already been described. The advantages of these further features of apparatus will be understood from what has already been written about corresponding process features.

In certain forms of apparatus according to the invention there is a vertical annealing shaft, the cross section of which is locally reduced at the bottom to define an entry slot for the ribbon and the apparatus has means for periodically exerting a gas displacing force in the entry slot.

In some apparatus according to the invention there is a vertical annealing shaft, the cross section of which is locally reduced at the bottom to define an entry slot for the ribbon and the apparatus has means for periodically exerting a gas displacing force in at least one zone in such vertical shaft.

In other important embodiments of apparatus according to the invention there isa bending roller about which, when the apparatus is in use, the glass ribbon is bent preparatory to being advanced through the annealing shaft, which shaft is substantially horizontal. The apparatus has means for periodically exerting a gas displacing force in at least one zone which is downstream of the bending roller along the ribbon path.

Apparatus according to the invention may include means for continuously exerting a gas displacing force in a given direction across the ribbon path, in at least one zone along such path, and for periodically exerting gas displacing force in that direction, superimposed on such continuously exerted force.

In preferred embodiments of apparatus according to the invention, means is provided for periodically exerting a gas displacing force in one direction and in a reverse direction across the ribbon path, in at least one zone along such path, and there is timing means for causing such forces acting in the different directions across the ribbon path to be repeatedly exerted and relaxed out-of-phase thereby to cause displacement of gases first in one direction across the ribbon and then in a reverse direction across the ribbon. Preferably, the positions at which such forces acting in different directions across the ribbon path are exerted are directly opposed across such path. It is an advantage if the one direction and the reverse direction across the ribbon path are directly opposite directions.

In certain apparatus according to the invention wherein means is provided for periodically exerting a gas displacing force in one direction and in a reverse direction across the ribbon path, in at least one zone, timing means is provided for causing each exertion of force in the one direction immediately to follow or to coincide with the relaxation of force exerted in the reverse direction.

In some apparatus according to the invention means is provided for periodically exerting a gas displacing force in at least one direction and at one side only of the ribbon in at least one zone along the ribbon path.

The invention includes apparatus in which means is provided for periodically exerting a gas displacing force in at least one direction on each side of the ribbon in at least one zone along the ribbon path. In apparatus embodying this feature, one advantageous arrangement is to provide means for periodically exerting a gas displacing force in at least one zone on each side of the ribbon and in the vicinity of one margin thereof, and there is timing means for causing the forces on opposite sides of the ribbon to be exerted alternately. Such apparatus can be used so that each exertion of force on one side of the ribbon causes displacement of gases in one direction across that side of the ribbon and in the reverse direction on the other side of the ribbon, or so that the exertion of force on one side of the ribbon, whichever side that may be, significantly affects the environment only on that side.

The invention also includes apparatus in which means is provided for causing a gas displacing force to be periodically exerted in at least one zone in the vicinity of one margin of the ribbon and in one direction across the ribbon, and also to be periodically exerted in the vicinity of the opposite margin of the ribbon and in a reverse direction across the ribbon, on the same side thereof, and in which there is timing means for causing the forces acting in opposite direction to be exerted alternately.

The invention also includes apparatus in which there is means for periodically exerting gas displacing forces in at least one zone in the vicinity of each of the opposed margins of the ribbon and on each side thereof, to cause gas displacements across the ribbon, and there is timing means for causing gas displacing forces to be exerted at the places according to a predetermined cycle to cause displacements of gas first in one direction and then in a reverse direction across the ribbon on each side thereof. In some embodiments of the invention such timing means operates to cause the gas displacing forces acting in one direction across the ribbon on opposite sides thereof, in a given zone along the ribbon path, to be exerted simultaneously and alternately with the forces acting in the reverse direction across the ribbon in that zone. This displacement schedule is of advantage in ensuring that the environment of the ribbon at any given zone along the ribbon path is influenced in the same way on both sides of the ribbon simultaneously. In other apparatus according to the invention, or in at least one other zone in the same apparatus, a timing means is provided which operates to cause forces acting in one direction across the ribbon on one side thereof to be exerted simultaneously with forces acting in the opposite direction across the other side of the ribbon and in alternation with forces which reverse the gas displacement at each side of the ribbon. This displacement schedule is of advantage in avoiding any risk of creating turbulent conditions at the marginal regions of the ribbon due to the collision of transverse gas streams moving across the ribbon in the same direction and meeting at a marginal zone.

In preferred embodiments of apparatus according to the invention there is means for periodically exerting a gas displacing force in at least one zone along the ribbon path by blowing gas into the environment of the ribbon. In particular, importance is attached to embodiments in which such means includes at least one gas ejector and means for periodically exerting a gas displacing force by blowing gas into the environment of the ribbon through such ejector. According to one arrangement which affords the advantage of a very efficient and accurate control, there are gas ejector devices for exerting gas displacing forces at different positions in the environment of the ribbon in at least one zone along the ribbon path, a common supply line for such devices, and gas distributing means including electrically controlled pneumatic valves for sequentially connecting different ejector devices to the common line.

The invention includes apparatus in which there are apertures in the peripheral wall of the annealing shaft and controllable closure means for controlling flow of gases through such apertures under the action of natural draft so that gas displacing forces are periodically exerted in at least one direction across the ribbon by such flow of gases. This feature enables energy consumption to be saved by making use of the existing natural draft forces to bring about displacement of gases across the ribbon path. Heating means, e.g., gas burners, may be provided for heating gases entering the annealing shaft via the apertures.

In certain apparatus according to the invention, there is in at least one zone along the ribbon path, at least one propeller for periodically exerting a gas displacing force. By means of propellers the required displacements of gases can be brought about without changing the composition of the gaseous environment of the ribbon.

It is recommended also to provide in apparatus according to the invention, means for exerting gas displacing forces across the ribbon path, on one or each side thereof, in a lower portion of the drawing chamber.

Apparatus according to the invention may be of any one of a variety of different basic designs. For example, the invention includes: (1) apparatus including a molten glass feed channel for holding a bath of molten glass of such depth that molten glass flows into the ribbon from the full depth of such bath; (2) apparatus including a molten glass feed channel for holding a bath of molten glass of such depth that the molten glass which flows into the ribbon is derived from the upper levels of such bath; and (3) apparatus including a molten glass feed channel along which molten glass feeds to the drawing zone while floating on a mass of material of higher specific gravity.

The invention includes sheet glass when manufactured by a process according to the invention or in apparatus according to the invention as hereinbefore defined.

DESCRIPTION OF THE PREFERRED EMBODIMENTS

The various embodiments of the invention which are illustrated in the drawing and which will now be described are to be considered only as illustrative examples of the invention and are not in any way limitative.

In the drawing horizonal lines are used to indicate the levels at which the viscosity values $10^{7.6}$ and $10^{13}$ poises, hereinbefore referred to, occur. It is to be understood that the precise level at which those viscosity values occur will depend in any given process on the characteristics of the drawing machine and the drawing conditions which prevail in that process and the positions of the horizontal lines in the drawings is correct for one particular set of operative conditions.

Figure 1:
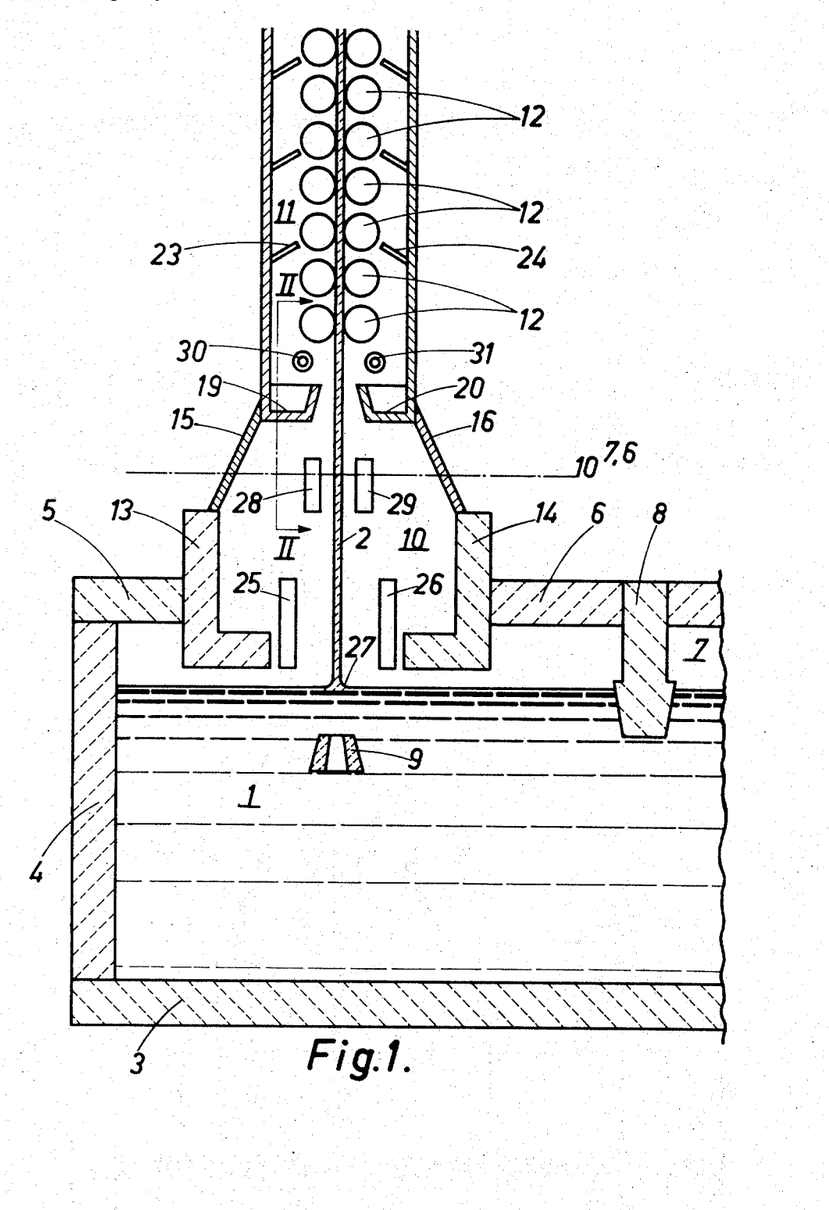
FIG. 1 is a cross-sectional elevational view of the drawing chamber and annealing shaft of a Pittsburgh-type glass drawing machine.
Figure 2:
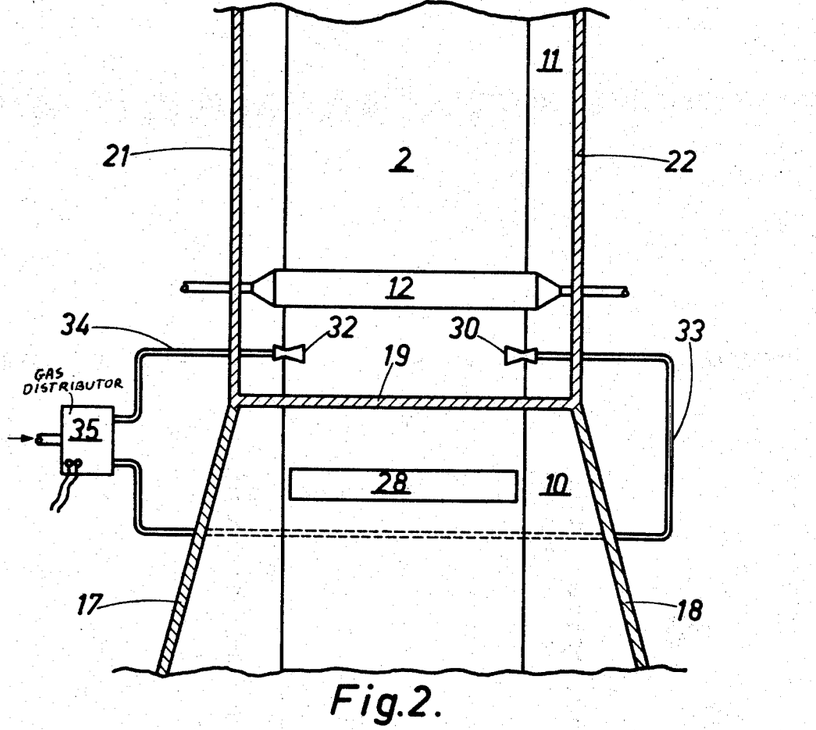
FIG. 2 is a cross-sectional view of part of this machine taken generally along the plane defined by line II–II of FIG. 1.

Referring firstly to FIGS. 1 and 2, these drawings illustrate an arrangement in which a ribbon of glass is drawn from a bath 1 of molten glass contained in a kiln having a sole wall 3, a terminal end wall 4 and top wall portions 5 and 6.

Molten glass flows along the kiln from right to the left in the aspect of the drawing. At a position short of the zone at which the glass ribbon 2 is drawn from the surface of the molten glass, a shut-off 8 dips into the upper layers of molten glass in the kiln to separate the atmosphere 7 comunicating with the glass melting furnace (not shown) from the atmosphere in contact with the glass at the drawing zone. At the drawing zone the position of the foot 27 of the glass ribbon is stabilized by a draw bar 9 immersed in the bath 1 of molten glass. The glass ribbon 2 is drawn upwardly through a drawing chamber 10 and through an annealing shaft 11 which surmounts the drawing chamber. The ribbon is drawn upwardly by a succession of rollers 12 located in the annealing shaft 11.

The drawing chamber 10 is defined by L-blocks 13 and 14, by upper wall portions 15 and 16 joining the tops of the L-blocks to the bottom of the annealing shaft 11 and by side walls 17 and 18 (FIG. 2).

At the bottom of the annealing shaft its cross section is locally reduced by catch pans 19 and 20 which define an entry slot via which the ribbon of glass enters the annealing shaft 11. The annealing shaft is of rectangular section, being closed at the sides by walls 21 and 22 (FIG. 2).

Within the annealing shaft there are successive compartments defined by screens such as 23, 24 which may be unapertured or apertured plates.

Within the drawing chamber there are main coolers 25, 26 which are situated close to the surface of the molten glass and serve to accelerate the setting of the glass ribbon which passes upwardly between these coolers.

At a higher level within the drawing chamber there are secondary coolers 28 and 29 which further promote the cooling of the glass ribbon. The main and secondary coolers comprise cooling tubes through which a cooling medium, normally water, is circulated.

The glass ribbon gradually cools as it is drawn upwardly through the drawing chamber and the annealing shaft and in consequence the viscosity of the glass in the ribbon progressively increases. The drawing illustrates the positions along the path of the glass ribbon at which the viscosity of the glass is $10^{7.6}$ poises and $10^{13}$ poises respectively.

During the drawing of the sheet glass the intense heating of the gaseous atmosphere at the drawing zone combined with the chimney effect of the shaft cause hot convection currents of gas to rise along the central part of the ribbon. These rising currents of gas originate not only from the drawing chamber but also include gas which is drawn into the drawing chamber from beneath the L-blocks 13 and 14. The central upward convection currents flow in counter-current to streams of colder gas which descend along the walls of the annealing shaft 11 and into the drawing chamber 10 through the slot defined by the catch pans 19 and 20. As these descending currents of gas enter the drawing chamber they expand and create turbulence. This turbulence is also promoted by the tendency of the main upward currents of hot gas to increase in velocity and to expand in the upper part of the drawing chamber. The interaction of the turbulent currents thus formed in the upper part of the drawing chamber, with the main vertical convection currents, tends to establish in that part of the drawing chamber a very complex system of currents. As hereinbefore stated, the results which have been achieved by the special corrective measure according to the invention have led to the supposition that this complex system of currents is in large part if not entirely responsible for the occurrence of dark stripes in the drawn sheet glass.

In order to prevent or radically reduce the occurrence of these particular defects in the drawn sheet glass, gas displacing forces are exerted in accordance with the invention to cause fluctuating displacement of gases across the ribbon path in at least one zone where the viscosity of the glass is between the aforesaid viscosity limits of $10^{7.6}$ and $10^{13}$ poises.

These gas displacing forces are exerted by blowing gas into the environment of the ribbon through pairs of ejectors located on opposite sides of the ribbon path in the lower portion of the annealing shaft. On one side of the ribbon path a pair of ejectors 30, 32 are provided as clearly appears in FIG. 2, while on the opposite side of the ribbon path, there is a similar pair of ejectors of which only one ejector (ejector 31) appears in the drawings. The ejectors are situated at a level between the catch pans 19 and 20 and the first pair of rollers 12 in the annealing shaft. The ejectors of each pair are situated adjacent the opposed margins of the ribbon path at one side thereof and are arranged to blow gas into the environment of the ribbon in a direction substantially normal to the line of motion of the ribbon and substantially parallel with its faces. The ejectors of each pair point in directly opposite directions across the ribbon path.

As appears from FIG. 2 the ejectors 30 and 32 are connected by conduits 33, 34 to a gas distributor 35 which incorporates an electrically controlled flap valve the position of which determines whether the gas under pressure which flows to the distributor from a source (not shown) is supplied to ejector 30 or to ejector 32. In fact the flap valve is controlled so that the gas is supplied first to one of these ejectors and then to the other and so on alternately so that gas is blown first in one direction across the ribbon path and then in the opposite direction across the ribbon path during the drawing of the glass. The gas which is forced through the ejectors is preheated by conducting it in heat-exchange relationship with hotter fluid in heat exchangers (not shown).

Satisfactory tests have been performed in which gas was supplied to the ejectors under a pressure of 400 grams per cm.$^2$ and wherein the gas streams discharged from the ejectors at a speed of 10 meters per second. The flap valve in the distributor 35 was controlled so that the force exertion period and the following "dead" period constituting each operation cycle of each ejector were in the ratio of 1:1. The period of each cycle was 20 seconds. It was noted that as a consequence of the displacements of gas across the ribbon path there was a notable reduction in the occurrence of dark stripes in the drawn sheet glass.

A similar improvement in quality of the sheet glass was obtained in another test in which the direction in which gas was blown across the ribbon path was reversed once every minute, the pressure and the rate of delivery of gas to the ejectors being appropriately adjusted.

In a modification of the described process, injectors 30, 32 were used but located just below the catch pans 19, 20 (i.e., just above the $10^{7.6}$ poises viscosity level) instead of in the lower end of the vertical annealing shaft, the ejectors being operated precisely as in the process described with reference to FIGS. 1 and 2. It was found that the displacements of gases caused by operating the ejectors at such lower level resulted in a notable improvement in the quality of the glass in that the occurrence of dark stripes which were in evidence when the glass was drawn without operating such ejectors, was almost entirely avoided. The results were thus marginally less satisfactory than when using the ejectors at the positions shown in FIG. 1.

Figure 3:
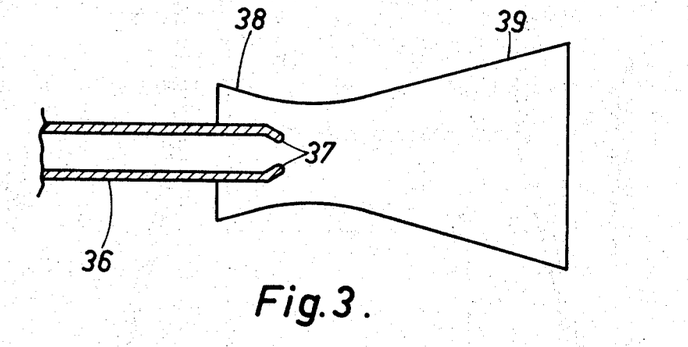
FIG. 3 is a detailed view showing one of the components used in the machine shown in FIGS. 1 and 2.

FIG. 3 illustrates a typical ejector which can be used in carrying out the invention. The ejector is of the so-called Giffard or Venturi type. The ejector comprises a delivery tube 36 from which the gas issues via an end orifice 37 within a surrounding sleeve, one end portion 38 of which converges towards the region at which gas issues from the tube 36 and the other end portion 39 of which diverges from that region. The use of such an ejector affords important advantages, in particular an economy in the consumption of gas under pressure, an economy of heat, the entrained gases attaining a higher temperature, an entrainment of a large quantity of environmental gases and a gas displacement rate which is appreciably in excess of the rate of delivery of gas through the ejector tube.

It has been observed that it is sufficient to inject air which has been preheated to about 60° C. After mixing of this injected air with environmental gas within the outer sleeve 39 of the ejector the mixture of gases which leaves the ejector tube and enters the free environment of the glass ribbon has a temperature very close to the normal environmental temperature at that region.

Figures 4, 5, 6:
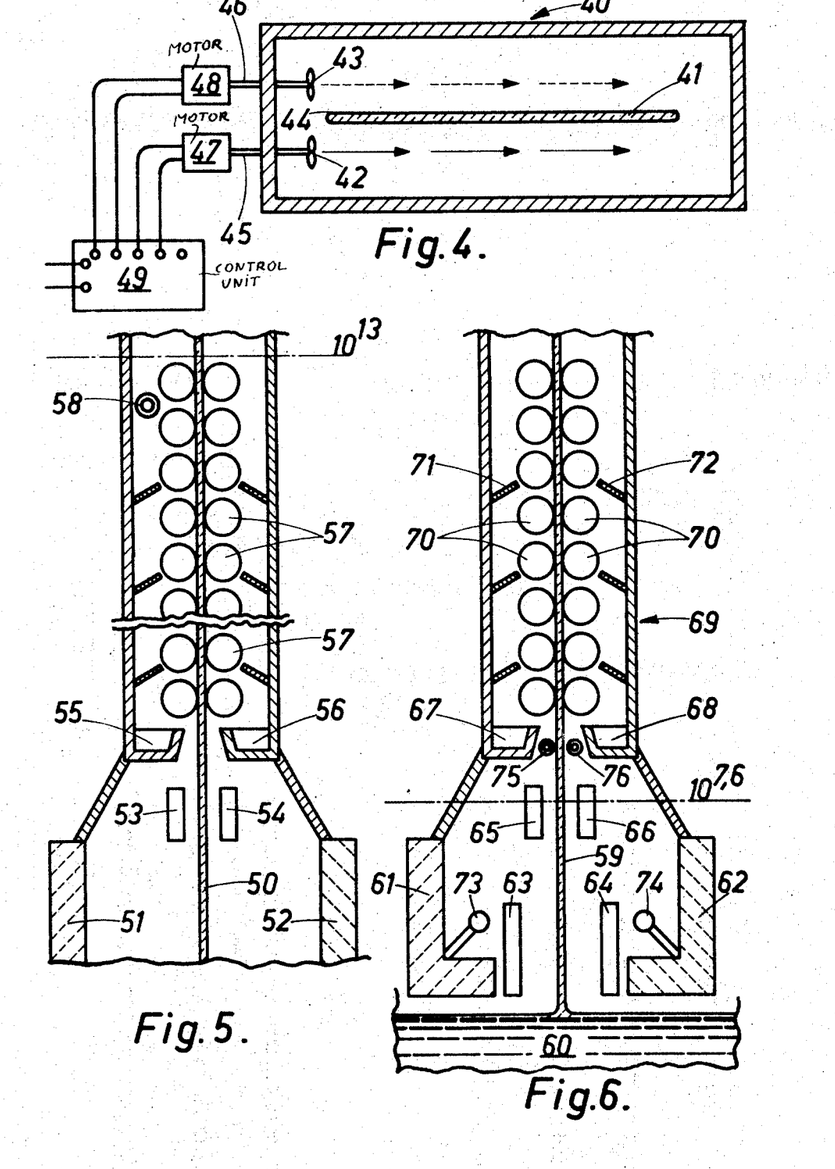
FIG. 4 is a cross-sectional plan view of the annealing shaft of another drawing machine according to the invention.
FIG. 5 is a cross-sectional elevational view of part of another glass drawing machine according to the present invention.
FIG. 6 is a cross-sectional elevational view of part of another machine according to the invention.

As an alternative to exerting gas displacing forces by discharging gas into the environment of the ribbon, such forces can be exerted by mechanical means as is exemplified in FIG. 4. This figure shows in cross section the annealing shaft 40 of another glass drawing machine used in carrying out the invention. The glass ribbon which is being drawn through this annealing shaft is represented at 41. A pair of small propellers 42, 43 are mounted, on opposite sides of the ribbon plane, on the shafts 45, 46 which extend through one of the side walls of the drawing shaft 40 at a level where the viscosity of the glass in the ribbon is not less than $10^{10}$ poises. These shafts are connected to electric motors 47, 48 which are in turn connected to a control unit 49. The propellers may be located at a level in the drawing shaft comparable to that of the ejectors in the embodiment described with reference to FIGS. 1 and 2, i.e., at a level between the catch pans and the first pair of drawing rollers.

The control unit 49 functions to cause first the propeller 42 and then the propeller 43 to rotate and so on alternately during the drawing of the sheet glass. In other words each propeller serves to exert a gas displacing force periodically in one direction across one side of the ribbon. The rotation of propeller 42 causes displacement of gases as indicated by the full line arrows whereas the succeeding operation of propeller 43 causes displacement of gases as indicated by the broken line arrows. The operation of the control unit 49 is such that each propeller is started up while the other propeller is slowing down so that there is a short period of overlap in their operations.

In one test performed with the system represented in FIG. 4 each cycle of operation of each propeller, such cycle including a period of rotation followed by an idle period, lasted from 4 to 10 seconds. In such tests a notable improvement in the quality of the sheet glass was found to result from the action of the propellers in that the glass was substantially unmarred by dark stripes.

It was found to be beneficial to adopt a longer period of rotation of the propeller acting at the cul-de-sac side of the glass ribbon than of the propeller acting at the other side. The cul-de-sac side of the ribbon is that side which faces the terminal end of the kiln from which the glass is drawn. In one test which had very satisfactory results, and in which a 10 second cycle was adopted, the period of rotation of the propeller 43 (which was at the cul-de-sac side) was 6 seconds and the period of rotation of the other propeller 42 was 4 seconds. By adopting different periods of rotation of the different propellers in each cycle account can be taken of the effects of the difference in environmental conditions at the two sides of the ribbon which make one side more liable to suffer from dark stripes than the other.

In a modification which was tested and found to give good results, the propellers were mounted so that their axes were inclined to the horizontal in planes parallel with the ribbon and the propellers exerted forces mainly obliquely upwardly across the ribbon path.

In a further modification, the propellers were mounted at a level in the top portion of the drawing chamber where the viscosity of the glass was a little above $10^{7.6}$ poises. It was found that very satisfactory results were achieved in countering the tendency for dark stripes to appear in the glass.

Reference is now made to FIG. 5 which shows part of a drawing machine of similar type to that shown in FIG. 1. In the machine shown in FIG. 5 a ribbon of glass 50 is drawn upwardly between two L-blocks 51 and 52 forming parts of the walls of the drawing chamber. The ribbon passes upwardly between secondary coolers 53 and 54 located in the upper part of the drawing chamber and then enters the annealing shaft between the catch pans 55 and 56. The ribbon is drawn upwardly through the annealing shaft by the pairs of rollers 57 located in the shaft. The drawing indicates the level at which the upper viscosity limit of $10^{13}$ poises is situated.

In one embodiment of the invention gas displacing forces are exerted in the annealing shaft at a zone situated somewhat below the upper viscosity level by discharging gas into the environment of the ribbon first through one and then through the other of a pair of ejectors which are located on the same side of the ribbon and in the vicinity of its opposed margins. One of these ejectors is shown in the drawing and is designated 58. The side of the ribbon at which the ejectors are located is the cul-de-sac side. The gas which is supplied under pressure to the ejectors is preheated by means which is not represented in the drawing.

In the embodiment of the invention presently in view, each operating cycle of each ejector, comprising one force exertion period and one "dead" period, was such that the force exertion and dead periods were of substantially equal duration and the pressure under which gas was supplied to each ejector was such that the speed of displacement of gas at the ejector sleeve orifice was of the order of 10 meters per second.

FIG. 6 is a view similar to FIG. 5 of a drawing machine in which the glass ribbon 59 is drawn upwardly from a bath of molten glass 60 through a drawing chamber including two L-blocks 61, 62, two main coolers 63, 64 and two secondary coolers 65, 66. The glass ribbon passes upwardly between catch pans 67, 68 into a vertical annealing shaft 69, the glass ribbon being drawn upwardly by pairs of rollers 70 between plates 71, 72 which divide the annealing shaft into a series of communicating compartments.

In the lower portion of the drawing chamber there are ejectors 73, 74 which are placed close to the L-blocks and behind the main coolers 63, 64. Gas is blown alternately through the ejectors 73, 74 in order to prevent an adverse temperature profile becoming established across the ribbon path such as occurs when the normal pattern of vertical convection currents due to the chimney effect of the shaft is allowed to become established in the drawing chamber. In consequence the action of these ejectors in the lower part of the drawing chamber results in a reduction in the occurrence of wave defects in the drawn sheet glass.

In accordance with the present invention gas displacing forces are also exerted periodically across the ribbon path at a different stage of the ribbon progress where the viscosity of the glass is appreciably higher. In the present embodiment these gas displacing forces are exerted in the slot between the catch pans 67 and 68. Forces are exerted by gas which is blown into the environment of the ribbon on each side thereof through two pairs of ejectors 75, 76. Only one ejector of each pair is shown but in fact the ejectors of each pair point in opposite directions and are disposed in the vicinity of the opposed margins of the ribbon. Gas is supplied to the ejectors of each pair so that they function out-of-phase. Consequently, there is a displacement of gas first in one direction and then in the opposite direction across the ribbon path on each side of the ribbon. The gas which is forced through the ejector is preheated to a temperature in the region of 60° C. In one test performed with the machine described with reference to FIG. 6, which gave very good results, gas was supplied to the ejectors under a pressure of 250 g./cm.$^2$ and each cycle of operation of each ejector, constituting one force exertion period and one relaxation period, was of 4 seconds duration, the force exertion period and the relaxation period being substantially equal. When operating in this way the drawn sheet glass became substantially free of dark stripes.

Figure 7:
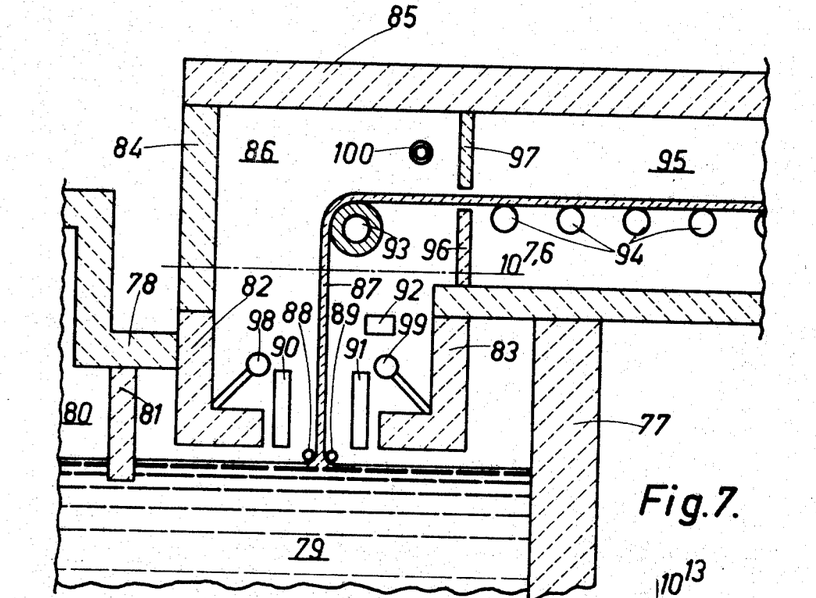
FIG. 7 is a cross-sectional elevational view of part of a machine according to the invention incorporating a horizontal annealing shaft.

Reference is now made to the machine illustrated in FIG. 7. In this machine the molten glass is drawn from a kiln of which part of the terminal end wall 77 and part of a roof 78 are shown in the drawing. The atmosphere above the molten glass 79, in the region 80, communicates with the glass melting furnace from which the molten glass is supplied. This atmosphere is isolated from the atmosphere above the molten glass at the drawing zone by a shut-off 81 which dips into the upper layers of the molten glass. The molten glass is drawn upwardly as a ribbon into a drawing chamber comprising L-blocks 82 to 83, an upper wall portion 84 and a roof wall 85. The drawing chamber is designated 86. The position of the root of the drawn glass ribbon is stabilized by rollers 88, 89. The ribbon is drawn vertically upwardly into the drawing chamber between main coolers 90, 91 and past a secondary cooler 92 located at a higher level in the drawing chamber. The ribbon then bends around a bending roller 93 located in the drawing chamber and is conveyed by rollers 94 through a horizontal annealing shaft 95. The interior of the anealing shaft is partitioned from the drawing chamber by partition walls 96, 97 which are spaced to define a slot for the passage of the ribbon. The partition wall 96 may, for example, be a refractory screen while the wall 97 may, for example, be an asbestos screen.

The drawing shows by a broken line the level at which the ribbon of glass has a viscosity of $10^{7.6}$ poises.

In order to counter the irregular cooling action of the thermally heterogeneous gas currents which prevail in the lower part of the drawing chamber 86, gas is discharged into the lower part of the drawing chamber through ejectors 98, 99 located in the neighborhood of the L-blocks 82 and 83. These ejectors function in an analagous manner to the ejectors 73, 74 described with reference to FIG. 6 so as to counter the formation of waves in the drawn glass sheet such as would occur if the thermally heterogeneous currents were not disturbed.

In order to apply the present invention a further pair of ejectors 100 are provided in the top part of the drawing chamber near to the entrance to the annealing shaft. Only one of this pair of ejectors is shown in the drawing. The two ejectors are, in fact, disposed in the vicinity of opposite margins of the ribbon path and point in opposite directions and gas is discharged first through one ejector and then through the other and so on, alternately.

In one test performed with this machine hot gas was supplied to the ejectors under a pressure of 300 g./cm.$^2$, the supply of the gas to the different ejectors being timed so that the moment at which the gas commenced to feed to one ejector coincided with the moment of cessation of supply of gas to the other ejector. In the result, the drawn glass ribbon was found to be substantially free of dark stripes.

In a modified embodiment the ejectors 100 were mounted so that they could be displaced parallel with their own axes to enable their positions across the ribbon path to be varied. In this way it was possible to cause the displacement of gases to occur over only a part of the width of the ribbon and in that case the improvement in quality in terms of freedom from dark stripes was realized for that part of the ribbon width.

Figure 8:
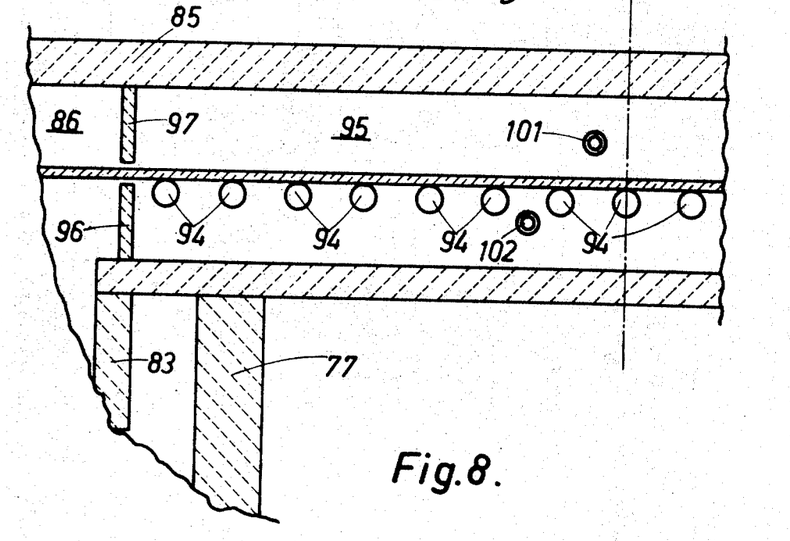
FIG. 8 is a cross-sectional elevational view of the horizontal annealing shaft of another glass drawing machine according to the invention.

FIG. 8 shows part of a machine which is substantially identical with that shown in FIG. 7 but in which gas displacing forces are periodically exerted in directions across the ribbon path by forcing gas through ejectors 101, 102 disposed on opposite sides of the ribbon path at positions within the annealing shaft which are quite close to the position at which the glass ribbon has a viscosity of $10^{13}$ poises and which is indicated by a broken vertical line. There are in fact two ejectors 101 and two ejectors 102, the ejectors of each pair being located in the vicinity of opposite margins of the ribbon and pointing in opposite directions, but only one ejector of each pair appears in the drawing. It will be noticed that the ejectors 101 are located at a position which is slightly further along the ribbon path than the ejectors 102. In tests in which gas was blown through the ejectors under a pressure of 200 g./cm.$^2$, causing displacements of gas across the ribbon path at a speed commencing at about 10 meters per second, the ejectors of each pair being operated alternately out-of-phase, it was found that the glass ribbon became of notably higher quality in terms of absence of dark stripes than when the machine was operated without feeding gas to the ejectors but under otherwise identical conditions.

Figure 9:
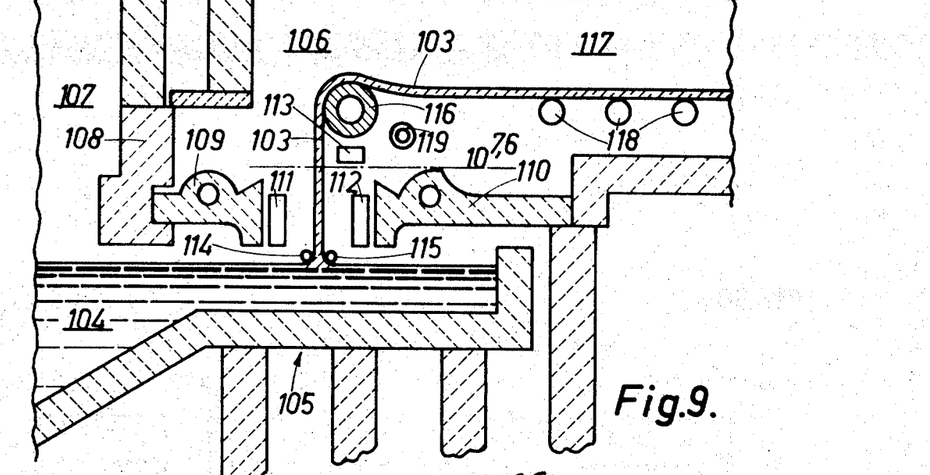
FIG. 9 is a horizontal cross-sectional view of part of a Libbey-Owens type drawing machine equipped for carrying out a process according to the invention.

FIG. 9 represents a drawing machine of classical Libbey-Owens type. In this machine a ribbon of glass 103 is drawn from the free surface of the bath 104 of molten glass held in a kiln 105. The atmosphere of the drawing chamber 106 located above the molten glass bath is separated from the atomsphere in the zone 107 which communicates with the glass melting tank furnace (not shown), by a wall 108.

The drawing chamber is defined in part by lip tiles 109, 110 situated close to the surface of the molten glass bath. At positions close to the inner faces of these lip tiles and on opposite sides of the glass ribbon there are main coolers 111, 112 and at a higher level of the drawing chamber there is a secondary cooler 113. The position of the bottom of the ribbon is stabilized by rollers 114, 115. After passing upwardly between the main coolers 111, 112 and past the secondary cooler 113, the glass ribbon 103 bends about a bending roller 116 and then proceeds through a horizontal annealing shaft 117 while supported on conveying rollers 118.

The drawing shows by a horizontal broken line the level along the ribbon path at which the ribbon glass has a viscosity of $10^{7.6}$ poises. The invention is applied by blowing gas into the environment of the ribbon through a pair of ejectors 119 of which only one appears in the drawing. These ejectors are located at a position which is just downstream of the bending roller 116. The ejectors are located in the vicinity of opposite margins of the ribbon path and point in opposite directions and gas is blown first through one ejector and then through the other ejector and so on alternately to cause a fluctuating displacement of gases across the ribbon in each direction, the displacements in the opposite directions being out-of-phase. The region at which the ejectors are located is a region where the environment of the ribbon is influenced by cold currents of gas whch originate from the annealing shaft and flow along the lower wall of this shaft into the drawing chamber and by currents of air which are cooled by contact with the bending roller 116. These relatively cool gas currents interact with the currents of hot gas which rise upwardly along the ribbon from the molten glass bath 104 and give rise to a complex system of gas current which exert a very non-uniform cooling action on the ribbon and are believed to be the cause of the defects known as dark stripes. By subjecting the gases in the environment of the ribbon at this region to gas displacement forces acting across the ribbon path, by blowing gas through the ejectors 119 as above referred to, it has been found possible to reduce the occurrence of these particular defects in the glass ribbon or even to entirely eliminate them.

Figure 10:
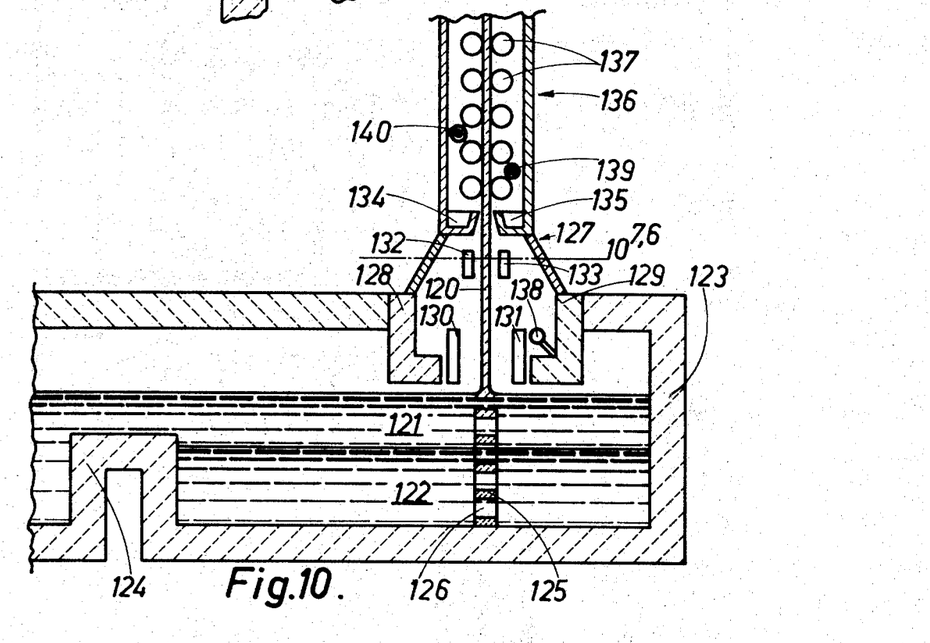
FIG. 10 is a cross-sectional elevational view of another machine incorporating a vertical annealing shaft equipped for carrying out the process according to the invention.

FIG. 10 shows another embodiment of the invention. In this embodiment the glass ribbon 120 is drawn from a supply of molten glass 121 which floats on a bath of meolten material 122 of higher specifiic gravity than the molten glass, for example, molten tin. The molten material is held in a kiln including the terminal end wall 123 and a sill 124 which extends transversely of the kiln up to a level above the surface of the molten tin so that this is confined to the zone between the sill and the terminal end wall 123. At the position from which the ribbon of glass is drawn, there is a wall 125 which extends upwardly from the bottom of the kiln to a level a short distance beneath the surface of the molten glass. This wall 125 is provided with openings 126 allowing for the free passage of molten material from one side of the wall to the other. The glass ribbon is drawn upwardly through a drawing chamber 127 including two L-blocks 128, 129, two main coolers 130, 131 and two secondary coolers 132, 133. The ribbon passes upwardly from the drawing chamber between catch pans 134 and 135 and enters the vertical annealing shaft 136 containing pairs of drawing rollers 137.

Within the drawing chamber 127 there is a pair of ejectors 138, only one of which appears in the drawing, located between L-block 129 and the main cooler 131. The ejectors 138 are located opposite the opposed margins of the ribbon and point in opposite directions across the ribbon path. Gas under pressure is supplied alternately to the opposed ejectors 138 so as to cause displacement of gases across the ribbon path, in the lower part of the drawing chamber, first in one direction and then in the reverse direction. This to-and-fro displacement of gases has the effect of disturbing the normal pattern of convection currents due to the chimney effect of the machine, and of eliminating or reducing the formation of wave in the drawn glass sheet.

The invention is applied by also discharging gas into the environment of the ribbon through pairs of ejectors 139, 140, disposed on opposite sides of the ribbon path at different levels of the annealing shaft. Gas is supplied under pressure first to one ejector and then the other ejctor of each pair to cause displacement of gas first in one direction and then in the opposite direction across the ribbon path on the side at which that pair of ejectors is located. The ejectors 139, 140 are located along the ribbon path at positions where the viscosity of the glass is well above $10^{7.6}$ poises. The position at which that viscosity prevails is indicated in the drawing by the horizontal broken line. The displacement of gases in the environment of the ribbon, caused by the discharge of gas into such environment through the ejectors 139, 140, disturbs the environment of the ribbon in such a way that the drawn glass ribbon is substantially free of dark stripes.

Figure 11:
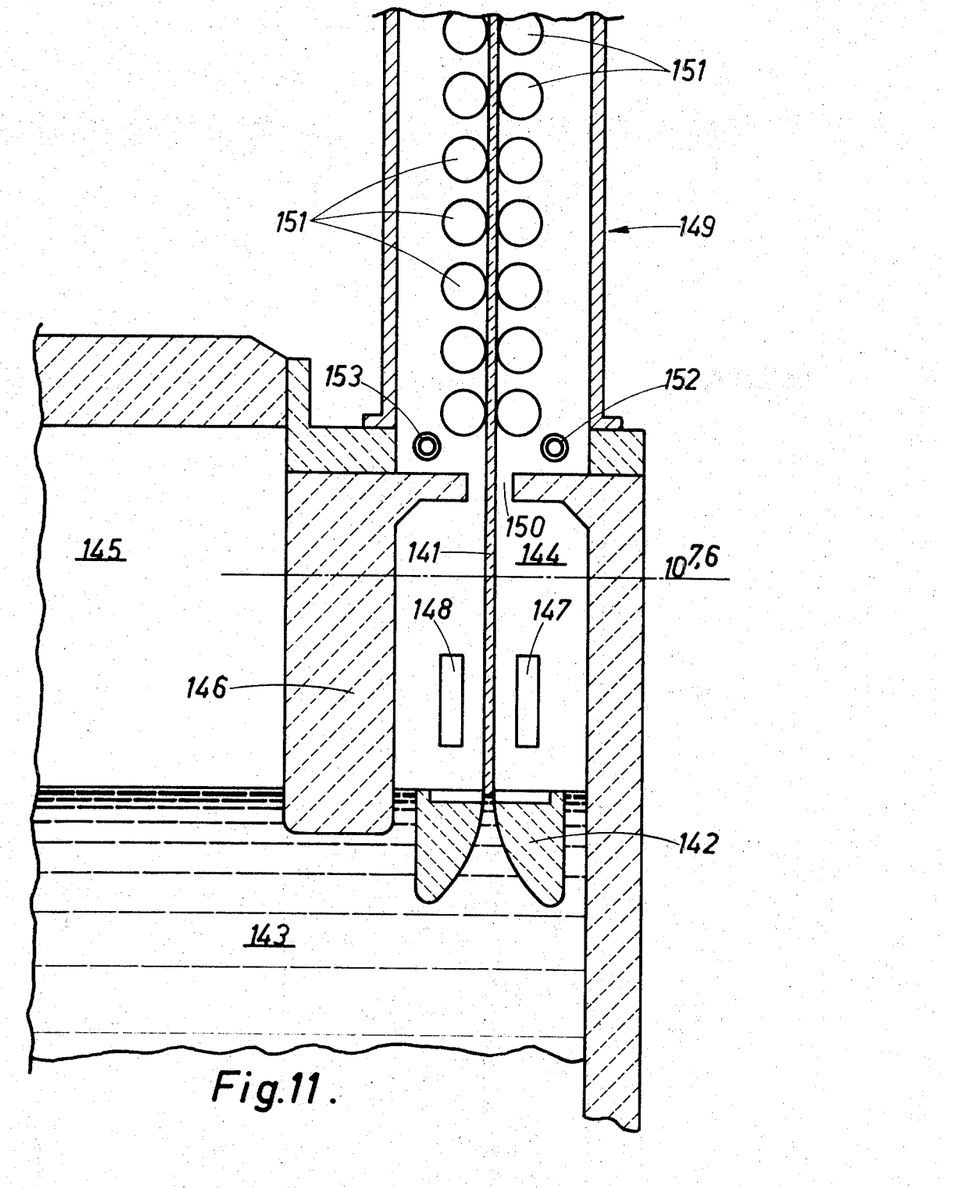
FIG. 11 is a cross-sectional elevational view of part of a Fourcault-type glass drawing machine equipped for carrying out a process according to the invention.

FIG. 11 illustrates the application of the invention to the drawing of sheet glass by the so-called Fourcalt process.

In this process molten glass is extruded upwardly into the ribbon 141 through a debiteuse 142 which is immersed in the molten glass bath 143. The glass ribbon 141 passes upwardly through a drawing chamber 144, the atmosphere in which is isolated from the atmosphere 145 communicating with the glass melting furnace (not shown) by a bridge wall 146 the lower portion of which is immersed in the molten glass 143. Within the drawing chamber there are coolers 147, 148 located on opposite sides of the ribbon path. The ribbon passes from the drawing chamber into a vertical annealing shaft 149 via slot 150 formed in the top wall of the drawing chamber. Within the annealing shaft there are pairs of rollers 151 which are responsible for entraining and guiding the ribbon. At the lower end of the annealing shaft 149 there are pairs of ejectors 152, 153. Only one ejector of each pair appears in the drawing. In fact, the ejectors of each pair are disposed in the vicinity of the opposed margins of the ribbon and point in opposite directions across the ribbon path.

Preheated gas is blown first through one ejector and then through the other ejector of each pair so as to cause displacement of gas in the environment of the ribbon, first in one direction and then in a reverse direction across the ribbon path, on each side thereof. The operating cycle of the different ejectors is timed so that the ejectors which point in the same direction across the ribbon path and are located in the vicinity of the same margin of the ribbon are operated simultaneously and in alternation with the ejectors which are in the vicinity of the opposite margin of the ribbon and act in the reverse direction across the ribbon path.

The action of the ejectors 152, 153, has the effect of substantially eliminating the occurrence of dark stripes in the drawn sheet glass.

Figure 12:
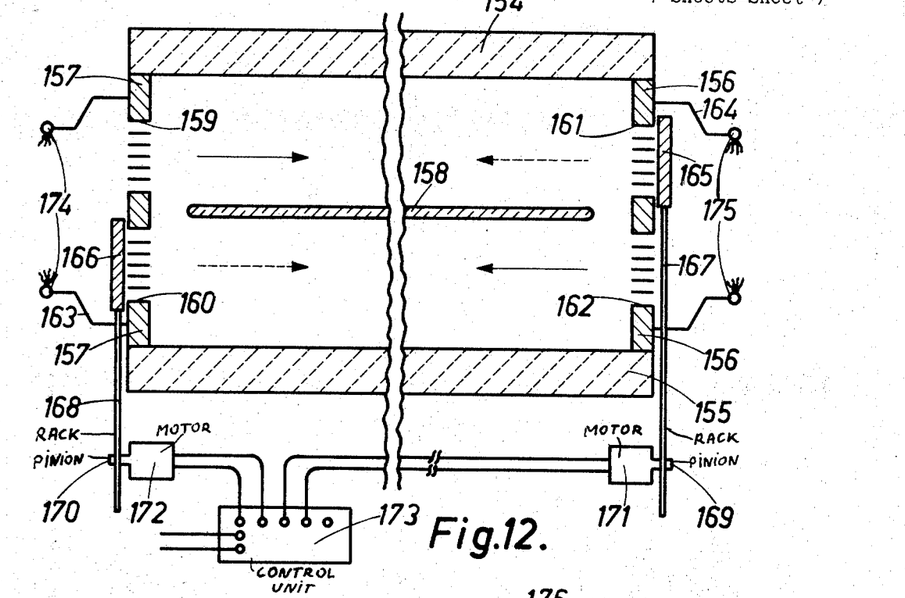
FIG. 12 is a cross-sectional plan view of the annealing shaft of another embodiment of the invention.

Reference is now made to FIG. 12 in which a further embodiment of the invention is illustrated. The machine which is illustrated in this figure includes an annealing shaft defined by refractory walls 154, 155 and by metal end walls 156, 157. The glass ribbon 158 is conveyed by rollers (not shown) along a path centrally of the annealing shaft. In the end walls 156, 157 there are ports 159, 160, 161, 162, which place the interior of the annealing shaft into communication with the interior funnels 163, 164. The ports are furnished with vanes for regulating the amount of gas flowing through the ports and for avoiding turbulence. The ports in the opposed end walls are provided with shutters 165, 166 each of which can be displaced from the position in which it closes one of the two ports in that wall, into a position in which it closes the other of those ports. The shutters are connected to toothed racks 167, 168 which are engaged by pinions 169, 170 which are driven by electric motors 171, 172 respectively. The motors 171, 172 are connected to a control unit 173 which operates the electric motors 171, 172 in such a way that the shutters 165, 166 are reciprocated out-of-phase, which means that when one of the shutters is in a position in which it closes off the port on one side of the ribbon path the other shutter is in a position in which it leaves open the port in the opposite wall which is on the same side of the ribbon path. The shutters are displaced simultaneously so that there is never a time in the operation of the machine in which two ports on the same side of the ribbon path are open.

The funnels 163, 164 are provided with gas burner tubes 174, 175 through which combustible gas is discharged and is burned so as to preheat the air which passes through that funnel into the appealing shaft under the action of the natural draft forces along the interior of the shaft. When the shutters are in their illustrated position, the natural draft forces cause gas to be drawn into the annealing shaft through the open ports, and the gas thus drawn into the annealing shaft moves across the ribbon path as indicated by the full-line arrows. After a predetermined period of time the shutters 165, 166 are displaced into their other positions and in the following phase of the cycle thus initiated, the natural draft forces cause gas to be drawn into the annealing shaft and to move in the reverse directions across the path of the ribbon as indicated by the broken line arrows. There is consequently a displacement of gases across each side of the ribbon, first in one direction and then in the reverse direction during the drawing of the sheet glass.

Figure 13:
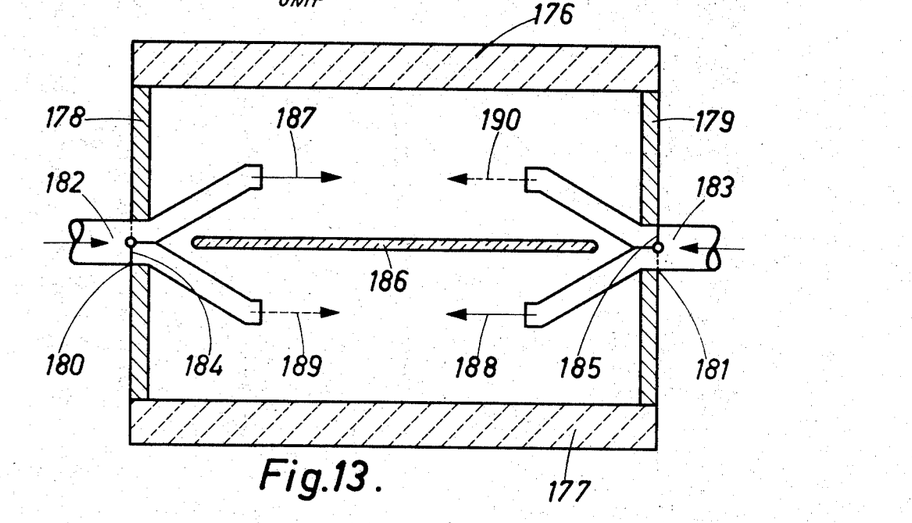
FIG. 13 is a cross-sectional plan view of the annealing shaft of another embodiment of the invention.

FIG. 13 represents yet another embodiment of the invention. The drawing shows only the general form of the annealing shaft of the drawing machine, omitting the rollers which are responsible for entraining and guiding the ribbon and omitting the drawing chamber. The annealing shaft is defined by refractory walls 176, 177 and by metal end walls 178, 179 formed with openings 180, 181 in which there are sealed gas discharge tubes 182, 183 which, within the annealing shaft, are branched to provide for the discharge of gases on opposite sides of the glass ribbon. In operation of the machine gas which has been preheated, e.g., in heat exchangers (not shown) situated in the annealing shaft, is supplied to the tubes 182, 183. Within these tubes there are flap valves 184, 185 which are constituted by two flaps mounted together at right angles to one another and which are displaced at predetermined intervals of time in order to switch the discharge of pre-heated gas from one tube branch to the other. The flap valves are displaced simultaneously and their relative positions are always such that while gas is discharging from one tube 182 on one side of the ribbon, gas is being discharged from the other tube on the opposite side of the ribbon. In the illustrated positions of the flap valves, gas discharges in the directions indicated by the full-line arrows 187, 188. After a predetermined period of time the flap valves are rotated through 90° causing the discharge of the preheated gases in the directions indicated by the broken-line arrows 189, 190.

In one test which was conducted with very satisfactory results, the positions of the flap valves were reversed ten times per minute.

In carrying out a process according to this embodiment it was found that the periodic displacement of gases on opposite sides of the ribbon had a marked beneficial effect in reducing the occurrence of dark stripes in the drawn sheet glass.

It will be understood that the above description of the present invention is susceptible to various modifications, changes and adaptations, and the same are intended to be comprehended within the meaning and range of equivalents of the appended claims.

I claim:

1. A process of manufacturing sheet glass comprising, in combination:
supplying molten glass to a drawing zone;
drawing glass from said zone as a continuous ribbon;
guiding said ribbon through zones in which the glass sets and cools; and
displacing gases across the ribbon in a fluctuating manner by periodically exerting a gas displacing force sufficient to disrupt the steady state of gas currents in at least one direction across the ribbon path in at least one zone along the glass ribbon path where the viscosity of the glass is at least $10^{7.6}$ poises and at most $10^{13}$ poises.

2. A process as defined in claim 1, wherein the gas displacing force is periodically exerted in at least one zone along the ribbon path where the viscosity of the glass is at least $10^{10}$ poises.

3. A process as defined in claim 1, wherein at least one of said cooling zones is a vertical annealing zone through which the glass passes upwardly and the cross section of which is locally reduced at the bottom to define an entry slot for the ribbon, and the gas displacing force is periodically exerted in said entry slot.

4. A process as defined in claim 1, wherein at least one of said cooling zones is a vertical annealing zone through which the glass passes upwardly and the cross section of which is locally reduced at the bottom to define an entry slot for the ribbon, and the gas displacing force is periodically exerted in at least one section of said vertical zone.

5. A process according to claim 1, wherein the ribbon of glass is bent over a bending roller preparatory to being advanced through a horizontal annealing zone and the gas displacing force is periodically exerted in at least one zone which is downstream of the said bending roller along the ribbon path.

6. A process as defined in claim 1, wherein the fluctuating displacement of gases is brought about substantially without increasing the rate of cooling of the glass ribbon.

7. A process as defined in claim 1, wherein in at least one zone along the ribbon path displacement of gases across the ribbon path occurs and such displacement is exclusively caused by the periodic exertion of gas displacing force in at least one direction.

8. A process as defined in claim 1, wherein in at least one zone along the ribbon path the gas displacing force is periodically exerted in one direction and in a reverse direction across the ribbon path, the forces acting in said different directions across the ribbon path being alternately exerted and relaxed out-of-phase thereby to cause displacement of gases on a side of the ribbon first in one direction across the ribbon and then in a reverse direction across the ribbon.

9. A process as defined in claim 8, wherein at least one zone along the ribbon path the gas displacing force is periodically exerted in one direction and in a reverse direction across the ribbon path, the forces acting in said different directions being exerted at positions which are substantially directly opposed across such path and being alternately exerted and relaxed out-of-phase.

10. A process as defined in claim 8, wherein in at least one zone along the ribbon path the gas displacing force which is periodically exerted in one direction and in a reverse direction across the ribbon path, each exertion of force in said one direction immediately follows or coincides with the relaxation of force in said reverse direction.

11. A process as defined in claim 1, wherein there is at least one zone along the ribbon path where displacement of gases across the ribbon path occurs due to successive exertions of force in that zone at a frequency such that a steady state of the gas currents along the ribbon path does not become established for sufficiently long a period for the glass to be adversely affected thereby.

12. A process as defined in claim 8, wherein there is at least one zone along the ribbon path where such an out-of-phase exertion and relaxation of gas displacing forces occurs and where the frequency of exertion of force in each direction is such that the period of each cycle from the commencement of one exertion to the commencement of the next exertion of force in that direction is at most 10 minutes.

13. A process as defined in claim 12, wherein the force exertion period and the relaxation period constituting each said cycle are in a ratio of from 1:2 to 2:1.

14. A process as defined in claim 12, wherein each force exertion period of each said cycle is from 1 to 10 seconds.

15. A process as defined in claim 14, wherein the force exertion period and the relaxation period of each said cycle are of substantially equal duration.

16. A process as defined in claim 1, wherein in at least one zone along the ribbon path the gas displacing force is periodically exerted at only one side of the ribbon.

17. A process as defined in claim 1, wherein in at least one zone along the ribbon path the gas displacing force is periodically exerted on each side of the ribbon.

18. A process as defined in claim 1, wherein in at least one zone along the ribbon path the gas displacing force is periodically exerted by blowing gas into the environment of the ribbon.

19. A process as defined in claim 18, wherein in at least one zone along the ribbon path the gas displacing force which is periodically exerted by blowing gas into the environment of the ribbon is preformed at a speed of from 1–50 m./sec.

20. A process as defined in claim 18, wherein in at least one zone along the ribbon path the gas displacing force which is periodically exerted by blowing gas into the environment of the ribbon is performed under a pressure in the range 100 g.–1000 g./cm.$^2$.

21. A process as defined in claim 1, wherein in at least one zone along the ribbon path the gas displacing force is periodically exerted by the action of mechanical means in the environment of the ribbon.

22. A process as defined in claim 1, wherein gas displacing forces causing displacements of gases in at least one direction across the ribbon on at least one side thereof are also exerted in at least one zone along the ribbon path where the viscosity of the glass is less than $10^{7.6}$ poises.

23. A process as defined in claim 22, wherein the gas displacing forces causing displacements of gases in at least one direction across the ribbon on at least one side thereof are exerted in a lower portion of the zone through which the glass ribbon is drawn and in which it becomes dimensionally set.

24. A process as defined in claim 1, wherein molten glass flows into said ribbon from the full depth of a quantity of molten glass in a channel into which molten glass is continuously fed.

25. A process as defined in claim 1, wherein molten glass flows into said ribbon from the upper levels of a mass of molten glass in a channel into which molten glass is continuously fed.

26. A process as defined in claim 1, wherein said ribbon of glass is drawn from molten glass floating on a mass of material of higher specific gravity.

27. Apparatus for use in manufacturing sheet glass, comprising, in combination:
a drawing chamber;
an annealing shaft contiguous with said drawing chamber;
means for drawing a continuous ribbon of glass into said drawing chamber from a drawing zone which is fed with molten glass and for conducting the ribbon along a path extending through said drawing chamber and annealing shaft;
means for displacing gases across the ribbon by periodically exerting a gas displacing force in at least one direction across the ribbon path in at least one zone along the ribbon path where the viscosity of the glass is at least $10^{7.6}$ poises and at most $10^{13}$ poises; and
control means for cyclically operating said gas displacing means to cause a fluctuating displacement of gases across the ribbon.

28. Apparatus as defined in claim 27, wherein the annealing shaft is a vertical shaft the cross section of which is locally reduced at the bottom to define an entry slot for the ribbon and said displacing means periodically exerts a gas displacing force in said entry slot.

29. Apparatus as defined in claim 27, wherein the annealing shaft is a vertical shaft the cross section of which is locally reduced at the bottom to define an entry slot for the ribbon and said displacing means periodically exerts a gas displacing force in at least one zone in said vertical shaft.

30. Apparatus as defined in claim 27, comprising a bending roller about which the glass ribbon is bent preparatory to being advanced through said annealing shaft, said shaft being substantially horizontal, said displacing means periodically exerting a gas displacing force in at least one zone which is downstream of the said bending roller along the ribbon path.

31. Apparatus as defined in claim 27, wherein said displacing means periodically exerts a gas displacing force in one direction and in a reverse direction across the ribbon path, in at least one zone along such path, and including control means for causing said forces acting in said different directions across the ribbon path to be exerted and relaxed out-of-phase thereby to cause displacement of gases first in one direction across the ribbon and then in a reverse direction across the ribbon.

32. Apparatus as defined in claim 31, wherein said displacing means exerts said out-of-phase force at positions which are substantially directly opposed across the ribbon path.

33. Apparatus as defined in claim 31, wherein said control means for causing each exertion of force in said one direction immediately to follow or to coincide with the relaxation of force exerted in said reverse direction.

34. Apparatus as defined in claim 27, wherein said displacing means periodically exerts a gas displacing force in at least one direction and at one side only of the ribbon in at least one zone along the ribbon path.

35. Apparatus as defined in claim 27, wherein said displacing means periodically exerts a gas displacing force in at least one direction on each side of the ribbon, in at least one zone along the ribbon path.

36. Apparatus as defined in claim 35, wherein said displacing means which periodically exerts a gas displacing force in at least one zone on each side of the ribbon does so in the vicinity of one margin thereof, and includes control means for causing the forces on opposite sides of the ribbon to be exerted alternately.

37. Apparatus as defined in claim 26, wherein said displacing means causes a gas displacing force to be periodically exerted in at least one zone in the vicinity of one margin of the ribbon and in one direction across the ribbon, and also to be periodically exerted in the vicinity of the opposite margin of the ribbon and in a reverse direction across the ribbon, on the same side thereof and includes control means for causing said forces acting in opposite directions across the ribbon path to be exerted alternately.

38. Apparatus as defined in claim 27, wherein said displacing means periodically exerts gas displacing forces in at least one zone, in the vicinity of each of the opposed margins of the ribbon and on each side thereof, to cause gas displacements across the ribbon and including control means for causing gas displacing forces to be exerted at the said places according to a predetermined cycle to cause displacements of gas first in one direction and then in a reverse direction across the ribbon on each side thereof.

39. Apparatus as defined in claim 38, wherein said control means operates to cause the gas displacing forces acting in one direction across the ribbon on opposite sides thereof, in a given zone along the ribbon path, to be exerted simultaneously and alternately with the forces acting in the reverse direction across the ribbon in that zone.

40. Apparatus as defined in claim 38, wherein said control means operates to cause the forces acting in one direction across the ribbon on one side thereof to be exerted simultaneously with forces acting in the opposite direction across the other side of the ribbon and in alternation with forces which reverse the gas displacement at each side of the ribbon.

41. Apparatus as defined in claim 27, wherein said displacing means periodically exerts a gas displacing force in at least one zone along the ribbon path by blowing gas into the environment of the ribbon.

42. Apparatus as defined in claim 41, comprising at least one gas ejector in at least one zone along the ribbon path and said displacing means periodically exerts a gas displacing force by blowing gas into the environment of the ribbon through such ejector.

43. Apparatus as defined in claim 42, comprising gas ejector devices for exerting gas displacing forces at different positions in the environment of the ribbon in at least one zone along the ribbon path, a common supply line for such devices, and gas-distributing means including electrically controlled pneumatic valves for sequentially connecting different ejector devices to said common line.

44. Apparatus as defined in claim 27, wherein said annealing shaft has apertures in the peripheral wall thereof and further comprising controllable closure means for controlling flow of gases through such apertures under the action of natural draft so that gas displacing forces are periodically exerted in at least one direction across the ribbon by such flow of gases.

45. Apparatus as defined in claim 27, wherein said displacing means includes at least one propeller for periodically exerting a gas displacing force and located in at least one zone along the ribbon path.

46. Apparatus as defined in claim 27, comprising means for exerting gas displacing forces across the ribbon path on at least one side thereof in a lower portion of the drawing chamber.

47. Apparatus as defined in claim 27, comprising a molten glass feed channel for holding a bath of molten glass of such depth that molten glass flows into the ribbon from the full depth of such bath.

48. Apparatus as defined in claim 27, comprising a molten glass feed channel for holding a bath of molten glass of such depth that the molten glass which flows into the ribbon is derived from the upper levels of such bath.

49. Apparatus as defined in claim 27, comprising a molten glass feed channel along which molten glass feeds to said drawing zone while floating on a mass of material of higher specific gravity.

References Cited

FOREIGN PATENTS 863,251   2/1971   Canada _____________ 65—203

ARTHUR D. KELLOGG, Primary Examiner

U.S. Cl. X.R.

65—194, 196, 204.